Nov. 14, 1933.  C. A. TEA  1,934,892
SPRING MOUNTING
Filed July 14, 1932
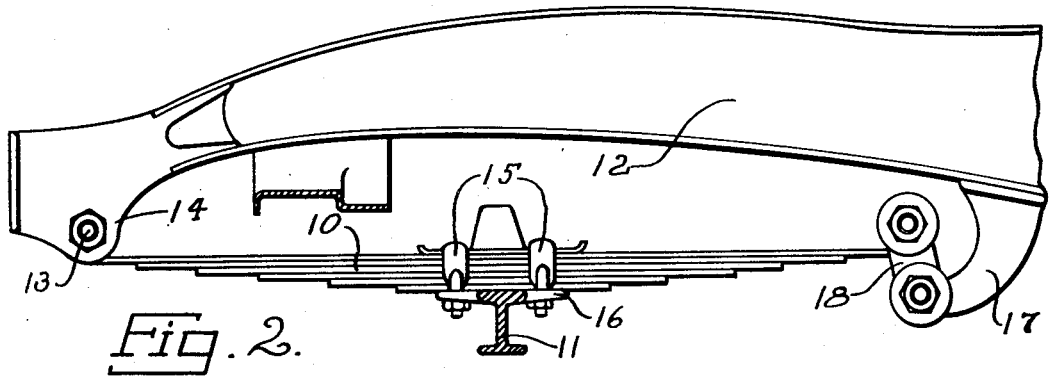
Fig. 2.
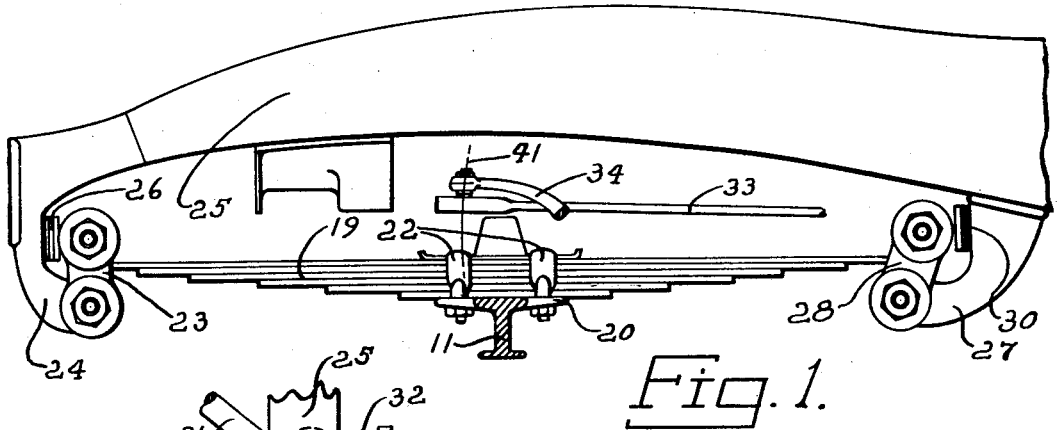
Fig. 1.
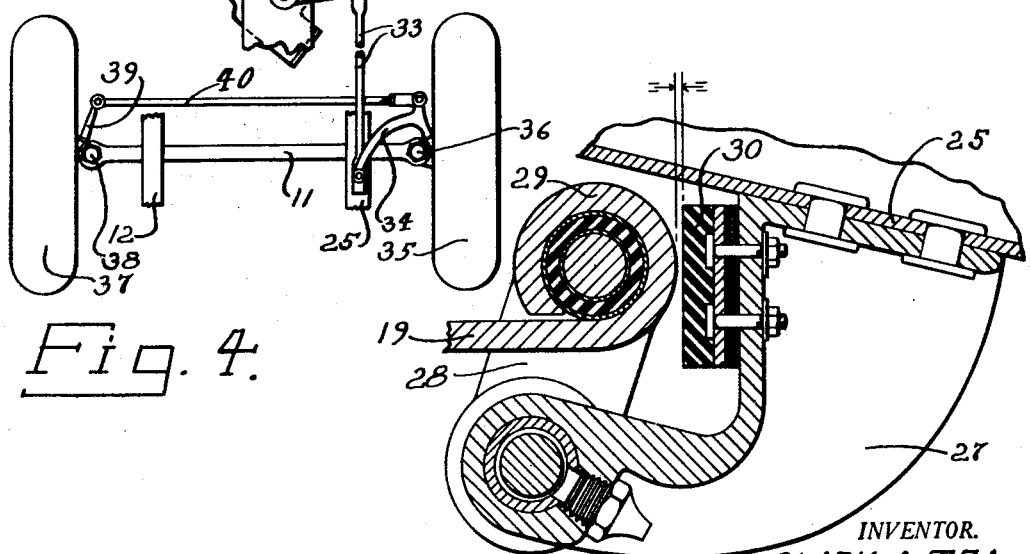
Fig. 4.
Fig. 3.
INVENTOR.
CLARK A. TEA.
BY
ATTORNEYS.

Patented Nov. 14, 1933

1,934,892

UNITED STATES PATENT OFFICE 1,934,892

SPRING MOUNTING

Clark A. Tea, Detroit, Mich., assignor to Chrysler Corporation, Detroit, Mich., a corporation of Delaware Application July 14, 1932. Serial No. 622,442

13 Claims. (Cl. 280—124)

This invention relates to an improved spring mounting, particularly for vehicle front springs.

The main objects of the invention are to provide an improved mounting for the end of the front axle on the steering side of the vehicle which permits fore and aft movement of the spring and the latter end of the axle during flexure of the spring; to provide a mounting of this character which eliminates wheel fight and shimmy during flexure of the spring; and to provide means for limiting rearward movement of the front spring on the steering side of the vehicle so as to prevent the turning of the front wheels which results in brake dive, by the tendency of the sprung portion of the vehicle to move relative to the unsprung portion thereof during brake applications.

Other objects of the invention are to provide a spring mounting of this character in which the weight of the sprung portion of the vehicle is utilized in yieldably opposing rearward movement of the front spring of the steering side of the vehicle; to provide shackle connections between the latter spring and the sprung portion of the vehicle which are disposed in such a manner as to manually urge the spring forwardly under the influence of the weight of the sprung portion; and to provide resilient means for yieldably opposing forward movement of the spring under the influence of the weight of the sprung portion of the vehicle.

Further objects of the invention are to provide in a spring mounting, means for shiftably supporting the spring so that the forces resulting from rotation of an unbalanced wheel journaled on the axle will move the spring and the end of the axle attached thereto in addition to turning the wheel about its king pin; to provide means for controlling the shifting of the axle under the influence of the forces resulting from rotation thereon of an unbalanced wheel so as to break up the vibratory resonance of the forces tending to aggravate turning of the wheel about its king pin; to provide a spring mounting of this character which is adapted to break up the vibratory resonance of the forces derived from the springiness in the chain of parts which constitute the steering apparatus from increasing the amplitude of turning of the steering wheels in response to the action of the unbalanced masses in such wheels during high speed rotation thereof so as to eliminate excessive high speed shimmy.

An illustrative embodiment of my invention is shown in the accompanying drawing, in which:

Fig. 1 is a fragmentary side elevational view of the front end of the steering side of a vehicle chassis showing my improved spring mounting.

Fig. 2 is a fragmentary side elevational view of the front end of the non-steering side of the chassis showing the spring mounting thereof.

Fig. 3 is an enlarged fragmentary side elevational view, partly in section, showing the rear end of the spring suspension somewhat in detail.

Fig. 4 is a plane view, diagrammatically illustrating an assembly including my improved spring mounting and the front axle, wheels, and steering apparatus of the vehicle.

In the form shown, my improved spring mounting, as illustrated in Fig. 1, is provided on the steering side of a vehicle chassis at the front end thereof. The front spring 10 of the non-steering side of the vehicle, illustrated in Fig. 2, is attached to the front axle 11 and to the side rail 12 on the non-steering side of the chassis in a conventional manner. The front end of the spring 10 has an eye (not shown) by which it is pivotally attached at 13 to a bracket or downwardly protruding portion 14 on the front end of the side rail 12. The intermediate portion of the spring 10 is rigidly clamped by U-bolts 15 to a spring seat 16 formed on the front axle 11. The rear end of the spring 10 is pivotally connected to a bracket 17 which extends downwardly from the side rail 12 by a shackle 18 which is pivotally secured to the spring 10 and bracket 17 at its respectively opposite ends.

The spring 19 of the steering side of the vehicle is likewise rigidly attached at its intermediate portion to a spring seat 20 on the axle 11 by U-bolts 22. The front end of the spring is provided with an eye (not shown) by which it is pivotally attached to the upper end of a shackle 23. The shackle 23 has its lower end pivotally mounted on a downwardly extending bracket 24 which protrudes from the forward extremity of the side rail 25 on the steering side of the chassis frame to a position below the spring 19. The shackle 23 normally extends upwardly from the lower end of the bracket 24 in a substantially vertical direction. Mounted on the bracket 24 is a yieldable stop 26, preferably comprising resilient material, such as rubber, which is engageable by the forward end of the spring 19.

The rear end of the spring 19 is pivotally connected with a bracket 27 mounted on the side rail 25 and extending downwardly to a position below the spring 19, by a shackle 28 which has its lower end pivotally attached to the bracket 27 and its upper end pivotally attached to an eye 29 formed on the rear end of the spring 19, as illustrated in Fig. 3. The shackle 28 extends upwardly and rearwardly from the lower end of the bracket 27 at an inclination to a vertical plane. A yieldable stop 30, comprising resilient material, preferably rubber, mounted on the bracket 27, is engageable with the eye 29 of the spring 19 and is normally spaced slightly therefrom, as illustrated in Fig. 3.

My improved spring mounting may be employed to advantage in conjunction with steering apparatus of many kinds. For the purpose of illustration, a conventional steering apparatus is shown which includes a steering column 31, a pitman arm 32, and a drag link 33. The forward end of the drag link is pivotally attached to a steering arm 34 which is rigidly connected with the right hand front wheel 35. The wheel 35 and its spindle are pivotally mounted on the front axle 11 by a king pin 36. A similar wheel 37 and its spindle are pivotally mounted on the left end of the axle 11 by a king pin 38, as viewed in Fig. 4. The wheel 37 has a steering arm 39 which is pivotally connected with the steering arm 34 of the wheel 35 by a tie rod 40.

In the operation of a vehicle having a spring mounting of the above character, the spring 19 on the steering side of the vehicle and the end of the axle on the steering side of the vehicle are free to shift fore and aft during compression and rebounding of the spring. This freedom of fore and aft movement permits the pivotal connection of the drag link 33 and steering arm 34 to travel on the same arc, as illustrated at 41 in Fig. 1, without requiring turning of the wheel 35 about its king pin. In this manner, wheel fight which occurs when the ends of the drag link and steering arm tend to travel on different arcs, is eliminated.

The stop 30, which is spaced from the rear end of the spring 19, permits limited movement of this spring and the end of the axle on the steering side of the vehicle of sufficient amplitude to prevent wheel fight. The stop 30, however, holds the spring 19 against excessive rearward movement and in so doing it prevents excessive relative movement of the front wheel on the steering side of the vehicle with respect to the sprung portion of the latter. This limitation of the rearward movement of the spring 19 during brake applications prevents serious brake dive which results from the turning of the forward extremities of the wheels to the right, as viewed in Fig. 4, when the front spring and wheel on the steering side of the vehicle shift rearwardly an excessive amount.

Both the front and rear shackles, 23 and 28, respectively, are placed under tension in supporting the weight of the vehicle. The rearward inclination of the rear shackle 28 with respect to a vertical plane causes the weight of the sprung portion of the vehicle to urge the spring 19 forwardly against the stop 26. Rearward movement of the spring 19, is therefore opposed by the weight of the vehicle which is applied on the rear end of the spring 19 in an inclined direction by reason of the inclination of the rear shackle 28. This influence of the weight of the sprung portion of the vehicle upon the spring 19 also aids in holding the latter against excessive rearward movement relative to the chassis frame and in this way assists in preventing brake dive.

There is present in the chain of parts of the steering apparatus a considerable degree of springiness which is brought into play when the front wheels are not accurately balanced and when they are rotated at high speed. The forces developed by rotation of unbalanced wheels at high speeds tend to turn the front wheels about their king pins. Such movement of the wheels is resisted by the parts of the steering apparatus which yield somewhat due to the springiness throughout the steering system. Frequently, a vibratory resonance occurs which aggravates the turning of the wheels about their king pins in this manner during high speed operation of a vehicle, causing what is known as high speed shimmy.

With my improved spring mounting the forces created by rotation of an unbalanced wheel at high speed not only tend to turn the wheels about their king pins but also tend to shift the end of the axle at the steering side of the vehicle and the spring 19 longitudinally of the chassis frame. By resiliently opposing movement of the spring 19 in one direction and employing the weight of the vehicle to oppose movement of this spring in another direction, a system is provided which differs in its vibratory action from that of the steering system and which breaks up the vibratory resonance in the steering apparatus. In this manner excessive turning of unbalanced wheels about their king pins at high speed operation of the vehicle and the high speed shimmy resulting therefrom is effectively guarded against.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. In a vehicle including sprung and unsprung portions, a spring mounted on one of said portions, means for shiftably connecting said spring to the other of said portions including a pair of tension shackles having their lower ends pivotally connected with said sprung portion and their upper ends pivotally attached to said spring, and means for holding one of said shackles against turning in one direction of the length of said spring from a vertical position, the other shackle being inclined with respect to a vertical plane and adapted to urge said spring and said unsprung portion in said direction of the length of said spring.

2. In a vehicle including sprung and unsprung portions, a spring mounted on one of said portions, means for shiftably connecting said spring to the other of said portions including a pair of tension shackles having their lower ends pivotally connected with said sprung portion and their upper ends pivotally attached to said spring, one of said shackles being inclined with respect to a vertical plane and adapted to urge said spring and said unsprung portion forwardly in the direction of the length of said spring, means for holding the other shackle against turning forwardly from a vertical position, and a resilient member for yieldably opposing movement of said spring rearwardly in the direction of the length of said spring.

3. In a vehicle including sprung and unsprung portions, a spring mounted on one of said portions, means for shiftably connecting said spring to the other of said portions including a front shackle element having its upper and lower ends pivotally attached to said spring and to said sprung portion respectively and normally disposed in substantially vertical position and including a rear shackle element having its upper and lower ends pivotally attached to said spring and to said sprung portion respectively and extending rearwardly from its lower end at an inclination to a vertical plane so as to urge said spring and said unsprung portion forwardly under the influence of the weight of said sprung portion, and means for holding said spring against excessive forward movement so as to maintain said front shackle in a substantially vertical position.

4. In a vehicle including sprung and unsprung portions, a spring mounted on one of said portions, means for shiftably connecting said spring to the other of said portions including a front shackle element having its upper and lower ends pivotally attached to said spring and to said sprung portion respectively and normally disposed in a substantially vertical position and including a rear shackle element having its upper and lower ends pivotally attached to said spring and to said sprung portion respectively and extending rearwardly from its lower end at an inclination to a vertical plane so as to urge said spring and said unsprung portion forwardly under the influence of the weight of said sprung portion, and a resilient element yieldably opposing forward movement of said spring whereby said spring is resiliently held under compression longitudinally.

5. In a vehicle including sprung and unsprung portions, a spring mounted on one of said portions, means for shiftably connecting said spring to the other of said portions including a pair of tension shackles having their lower ends pivotally connected with said sprung portion and their upper ends pivotally attached to said spring, one of said shackles being inclined with respect to a vertical plane and adapted to urge said spring and said unsprung portion in one direction of the length of said spring, and a yieldable stop normally slightly spaced from and engageable by said spring for arresting movement of said spring in an opposite direction after a predetermined movement thereof in the latter direction.

6. In a vehicle including sprung and unsprung portions, a spring mounted on one of said portions, means for shiftably connecting said spring to the other of said portions including a pair of tension shackles having their lower ends pivotally connected with said sprung portion and their upper ends pivotally attached to said spring, one of said shackles being inclined with respect to a vertical plane and adapted to urge said spring and said unsprung portion in one direction of the length of said spring, a resilient member for yieldably opposing movement of said spring in said direction, and a yieldable stop normally slightly spaced from and engageable by said spring for arresting movement of said spring in an opposite direction after a predetermined movement thereof in the latter direction.

7. In a vehicle including sprung and unsprung portions, a spring mounted on one of said portions, means for shiftably connecting said spring to the other of said portions including a front shackle element having its upper and lower ends pivotally attached to said spring and to said sprung portion respectively and normally disposed in a substantially vertical position and including a rear shackle element having its upper and lower ends pivotally attached to said spring and to said sprung portion respectively and extending rearwardly from its lower end at an inclination to a vertical plane so as to urge said spring and said unsprung portion forwardly under the influence of the weight of said sprung portion, a resilient element yieldably opposing forward movement of said spring whereby said spring is resiliently held under compression longitudinally, and a yieldable stop engageable by said spring for arresting rearward movement thereof after a predetermined movement thereof in a rearward direction.

8. In a vehicle including a chassis frame and a front axle, a spring having its intermediate portion mounted on said axle, means for connecting the ends of said spring with said chassis frame including brackets on said chassis and including shackle links pivotally attached to said brackets and to the ends of said spring and extending downwardly from the ends of said spring, one of said shackle links being disposed at an inclination to a vertical plane and adapted to urge said spring in one direction under the influence of the weight of said chassis frame, and a rubber member for yieldably opposing movement of said spring in said direction interposed between one of said brackets and the adjacent end of said spring.

9. In a vehicle including a chassis frame and a front axle, a spring having its intermediate portion mounted on said axle, means for connecting the ends of said spring with said chassis frame including brackets on said chassis and including shackle links pivotally attached to said brackets and to the ends of said spring and extending downwardly from the ends of said spring, one of said shackle links being disposed at an inclination to a vertical plane and adapted to urge said spring in one direction under the influence of the weight of said chassis frame, a rubber member for yieldably opposing movement of said spring in said direction interposed between one of said brackets and the adjacent end of said spring, and a rubber member mounted on the other bracket and spaced from the end of said spring adjacent thereto for limiting movement of said spring in an opposite direction after a predetermined movement thereof in the latter direction.

10. In a vehicle, a chassis including a frame having steering apparatus on one side thereof and including a front axle, a main spring mounted on said front axle at the non-steering side of said vehicle having one end directly pivoted thereon and its other end pivotally connected thereto by a shackle, a main spring mounted on said axle at the steering side of said vehicle, means for shiftably connecting the latter spring to said frame including a pair of tension shackles having their upper and lower ends pivotally attached to the latter spring and to said frame respectively, one of said shackles being inclined with respect to a vertical plane and adapted to urge said second mentioned main spring and the end of said axle on the steering side of said vehicle in one direction longitudinally of said vehicle under the influence of the weight of the sprung portion thereof.

11. In a vehicle, a chassis including a frame having steering apparatus on one side thereof and including a front axle, a main spring mounted on said front axle at the non-steering side of said vehicle having one end directly pivoted thereon and its other end pivotally connected thereto by a shackle, a main spring mounted on said axle at the steering side of said vehicle, means for shiftably connecting the latter spring to said frame including a pair of tension shackles having their upper and lower ends pivotally attached to the latter spring and to said frame respectively, one of said shackles being inclined with respect to a vertical plane and adapted to urge said second mentioned main spring and the end of said axle on the steering side of said vehicle in one direction longitudinally of said vehicle under the influence of the weight of the sprung portion thereof, and a resilient element for yieldably opposing such movement of said second mentioned spring whereby to resiliently hold the latter under compression longitudinally.

12. In a vehicle, a chassis including a frame having steering apparatus on one side thereof and including a front axle, a main spring mounted on said front axle at the non-steering side of said vehicle having one end directly pivoted thereon and its other end pivotally connected thereto by a shackle, a main spring mounted on said axle at the steering side of said vehicle, means for shiftably connecting the latter spring to said frame including a pair of tension shackles having their upper and lower ends pivotally attached to the latter spring and to said frame respectively, one of said shackles being inclined with respect to a vertical plane and adapted to urge said second mentioned main spring and the end of said axle on the steering side of said vehicle in one direction longitudinally of said vehicle under the influence of the weight of the sprung portion thereof, a resilient element for yieldably opposing such movement of said second mentioned spring whereby to resiliently hold the latter under compression longitudinally, and a yieldable stop engageable by said second mentioned main spring for arresting movement thereof in an opposite direction after a predetermined movement thereof in the latter direction.

13. In a vehicle, a chassis including a frame having steering apparatus on one side thereof and including a front axle, a main spring mounted on said front axle at the steering side of said vehicle, means for shiftably connecting said spring with said chassis frame including a pair of tension shackles having their upper and lower ends pivotally attached to said spring and to said chassis frame respectively, one of said shackles being inclined rearwardly from its lower end with respect to a vertical plane and adapted to urge said spring forwardly under the influence of the weight of the sprung portion of said vehicle, and means for holding the other shackle against turning under the influence of said rearwardly inclined shackle.

CLARK A. TEA.